(12) United States Patent
Kishimoto et al.

(10) Patent No.: US 7,941,041 B2
(45) Date of Patent: May 10, 2011

(54) IMAGE PICKUP APPARATUS

(75) Inventors: Tsuyoshi Kishimoto, Hyogo (JP);
Hisamo Sogawa, Hyogo (JP); Norihiko Akamatsu, Osaka (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/927,025

(22) Filed: Nov. 4, 2010

(65) Prior Publication Data

US 2011/0052167 A1    Mar. 3, 2011

Related U.S. Application Data

(62) Division of application No. 12/286,771, filed on Oct. 2, 2008, now Pat. No. 7,853,136.

(30) Foreign Application Priority Data

Oct. 5, 2007   (JP) ................ P2007-261868

(51) Int. Cl.
  *G03B 17/00*  (2006.01)
  *G03B 3/00*   (2006.01)
(52) U.S. Cl. .......... 396/60; 396/124
(58) Field of Classification Search ........... 396/60, 396/80, 84, 92, 111, 121, 124, 125, 128
See application file for complete search history.

(56) References Cited

U.S. PATENT DOCUMENTS

| | | | | |
|---|---|---|---|---|
| 5,051,767 | A | * | 9/1991 | Honma et al. .......... 396/80 |
| 5,721,977 | A | * | 2/1998 | Yamawaki et al. ...... 396/92 |
| 5,805,939 | A | * | 9/1998 | Hamamura et al. ..... 396/123 |
| 6,088,536 | A | | 7/2000 | Nakahara et al. |
| 6,122,450 | A | * | 9/2000 | Nakahara et al. ....... 396/80 |
| 7,046,290 | B2 | | 5/2006 | Nozaki |
| 2008/0018774 | A1 | | 1/2008 | Nakajima et al. |

FOREIGN PATENT DOCUMENTS

JP    2001-208961 A    8/2001

* cited by examiner

*Primary Examiner* — W. B. Perkey
*Assistant Examiner* — Dennis Hancock
(74) *Attorney, Agent, or Firm* — Lerner, David, Littenberg, Krumholz & Mentlik, LLP

(57) ABSTRACT

An image pickup apparatus includes an imaging optical system; a display unit; a detecting unit performing focus detection in phase difference detection; a focusing unit performing focus control of a lens in the imaging optical system on the basis of the focus detection result; an imaging unit generating an image signal concerning an optical image of a subject; an electronic zoom unit zooming in or out the image of the subject displayed in the display unit on the basis of the image signal by performing signal processing; and a switching unit switching between an electronic zoom active state and an electronic zoom inactive state. The detecting unit includes a sensor unit including a first licensor and a second licensor; a setting unit that sets detection sections having the same section length in the first and second licensors; a focus detecting unit; and a section length controlling unit.

3 Claims, 15 Drawing Sheets

IMAGE PICKUP APPARATUS

CROSS REFERENCES TO RELATED APPLICATIONS

This application is a divisional of U.S. application Ser. No. 12/286,771, filed Oct. 2, 2008, which claims priority from Japanese Patent Application No. JP 2007-261868 filed in the Japanese Patent Office on Oct. 5, 2007, the entire contents of which are incorporated herein by reference.

BACKGROUND OF THE INVENTION

1. Field of the Invention

The present invention relates to a technology for an image pickup apparatus capable of focus detection in phase difference detection.

2. Description of the Related Art

Single-lens reflex digital cameras in related art were generally unable to perform live view display (preview display) in which subjects are displayed on monitors in motion picture modes before actual image capturing and no single-lens reflex digital camera had an electronic zoom function. However, single-lens reflex digital cameras having the live view function have been supposed in recent years and the necessity of the electronic zoom function is gradually increased.

Meanwhile, compact digital cameras capable of cutting out part of images captured by image pickup devices to realize the electronic zoom function have been manufactured (for example, refer to Japanese Unexamined Patent Application Publication No. 2001-208961).

The digital camera disclosed in Japanese Unexamined Patent Application Publication No. 2001-208961 performs focus detection in contrast detection (contrast automatic focusing (contrast AF)) by using only a focus detection area (AF area) within a cutout range of a captured image set in the electronic zoom, among five focus detection areas arranged in an image pickup screen, to realize appropriate focus detection in the electronic zoom.

SUMMARY OF THE INVENTION

However, since a process of improving the accuracy of the focus detection is not specially performed in the focus detection area within the cutout range in the digital camera (image pickup apparatus) disclosed in Japanese Unexamined Patent Application Publication No. 2001-208961, out-of focus can be highly visible in an image that is zoomed in (of which the zoom state is varied) by the electronic zoom. When the focus detection in each focus detection area is unable to be accurately performed (for example, when an image of a subject whose brightness is slightly varied in the focus detection area is captured), a user visually recognizes defocusing to be aware of out-of focus in an image that is magnified by the electronic zoom even if the out-of focus is not detected in the normal live view display. In such a case, for example, restriction of the focus detection area to an area where the brightness of the subject is varied allows the accuracy of the focus detection to be improved. As a result, the out-of focus is made invisible even in the magnified image and appropriate focus detection can possibly be performed.

A technology of varying the size of each focus detection area or shifting the position thereof depending on the cutout range is shown in, for example, FIGS. 12 and 13 in Japanese Unexamined Patent Application Publication No. 2001-208961. However, such variation or shift can be performed because each focus detection area is set as the focus detection area for the contrast AF. Accordingly, it is difficult to apply the technology in a phase difference AF module in which the position of each focus detection area is fixed with respect to the image pickup screen to perform focus detection in phase difference detection (phase difference AF).

In addition, when the zoom magnification concerning optical zoom is decreased, the possibility in which both a near-side subject (near-side subjects), such as a person (persons), and a far-side subject (far-side subjects), such as a mountain (mountains), exist in the focus detection area is increased. Such a situation is called mixture of near and far subjects. Since it is difficult to separate the near-side subject from the far-side subject in the focus detection area where the mixture of near and far subjects occurs to perform the focus detection, it is difficult to focus, for example, only on the near-side subject. When the decrease in the zoom magnification (a variation in the zoom state) occurs, the restriction of the focus detection area to a range in which the near-side subject exists, as in the electronic zoom, allows the focus detection to be performed only for the near-side subject and the appropriate focus detection can possibly be performed.

It is desirable to provide an image pickup apparatus capable of performing the appropriate focus detection in the phase difference detection depending on the zoom state concerning a subject.

According to an embodiment of the present invention, an image pickup apparatus includes an imaging optical system; a display unit; detecting means for performing focus detection in phase difference detection; focusing means for performing focus control of a lens in the imaging optical system on the basis of the result of the focus detection by the detecting means; imaging means capable of generating an image signal concerning an optical image of a subject, received through the imaging optical system in which the focus control of the lens is performed; electronic zoom means for zooming in or out the image of the subject displayed in the display unit on the basis of the image signal generated by the imaging means by performing signal processing to the image signal; and switching means for switching between an electronic zoom active state in which the electronic zoom means is activated and an electronic zoom inactive state in which the electronic zoom means is inactivated. The detecting means includes a sensor unit including a first licensor and a second licensor in which pixels are arranged; setting means for setting detection sections having the same section length in the first licensor and the second licensor; focus detecting means for performing the focus detection in the phase difference detection on the basis of an optical image of the subject detected in each detection section set in the first licensor and the second licensor; and section length controlling means for making the section length of the detection section in the electronic zoom active state shorter than that of the detection section in the electronic zoom inactive state.

According to another embodiment of the present invention, an image pickup apparatus includes an imaging optical system capable of varying a zoom magnification concerning optical zoom; detecting means for performing focus detection in phase difference detection; focusing means for performing focus control of a lens in the imaging optical system on the basis of the result of the focus detection by the detecting means; and imaging means capable of generating an image signal concerning an optical image of a subject, received through the imaging optical system in which the focus control of the lens is performed. The detecting means includes a sensor unit including a first licensor and a second licensor in which pixels are arranged; setting means for setting detection sections having the same section length in the first licensor and the second licensor; focus detecting means for performing the focus detection in the phase difference detection on the basis of an optical image of the subject detected in each detection section set in the first licensor and the second licensor; and section length controlling means for decreasing the section length of the detection section in accordance with a decrease in the zoom magnification.

According to the present invention, when the detection sections having the same section length are set in the first and second licensors and the focus detection in the phase difference detection is performed on the basis of an optical image of the subject detected in each detection section set in the first and second licensors, the section length of the detection section in the electronic zoom active state is made shorter than that in the electronic zoom inactive state. As a result, any out-of focus is made invisible even in an image that is zoomed in by the electronic zoom and the appropriate focus detection can be performed.

According to the present invention, when the detection sections having the same section length are set in the first and second licensors and the focus detection in the phase difference detection is performed on the basis of an optical image of the subject detected in each detection section set in the first and second licensors, the section length of the detection section is decreased in accordance with a decrease in the zoom magnification concerning the optical zoom. As a result, the focus detection can be performed only for, for example, the near-side subject even if the mixture of near and far subjects occurs due to the decrease in the zoom magnification to perform the appropriate focus detection.

DESCRIPTION OF THE PREFERRED EMBODIMENTS

First Embodiment

Figure 1:
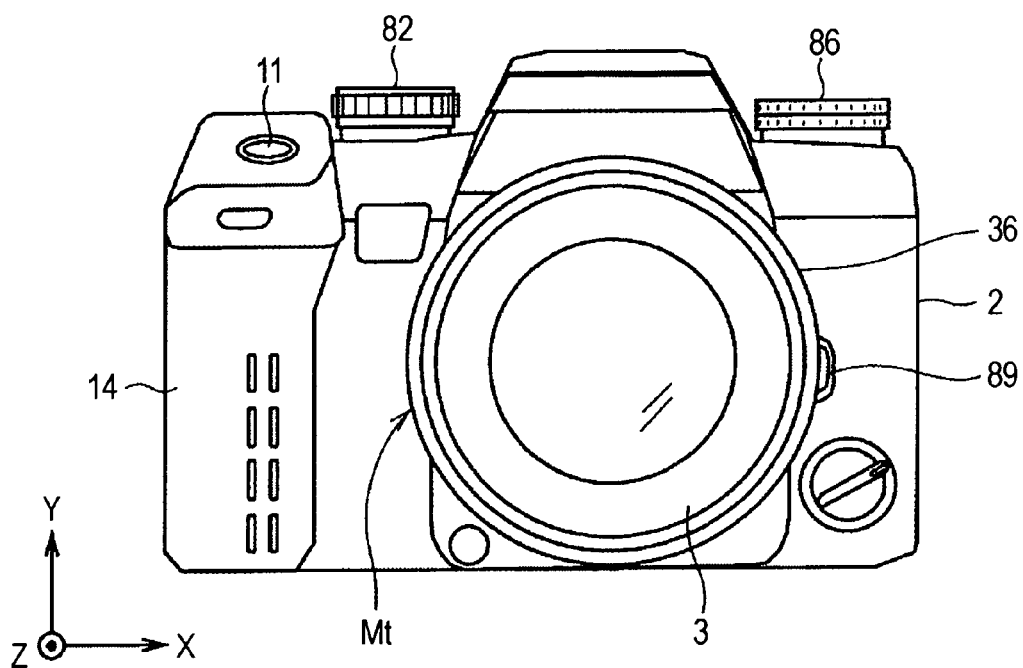
FIG. 1 is an external front view of an image pickup apparatus according to a first embodiment of the present invention.
Figure 2:
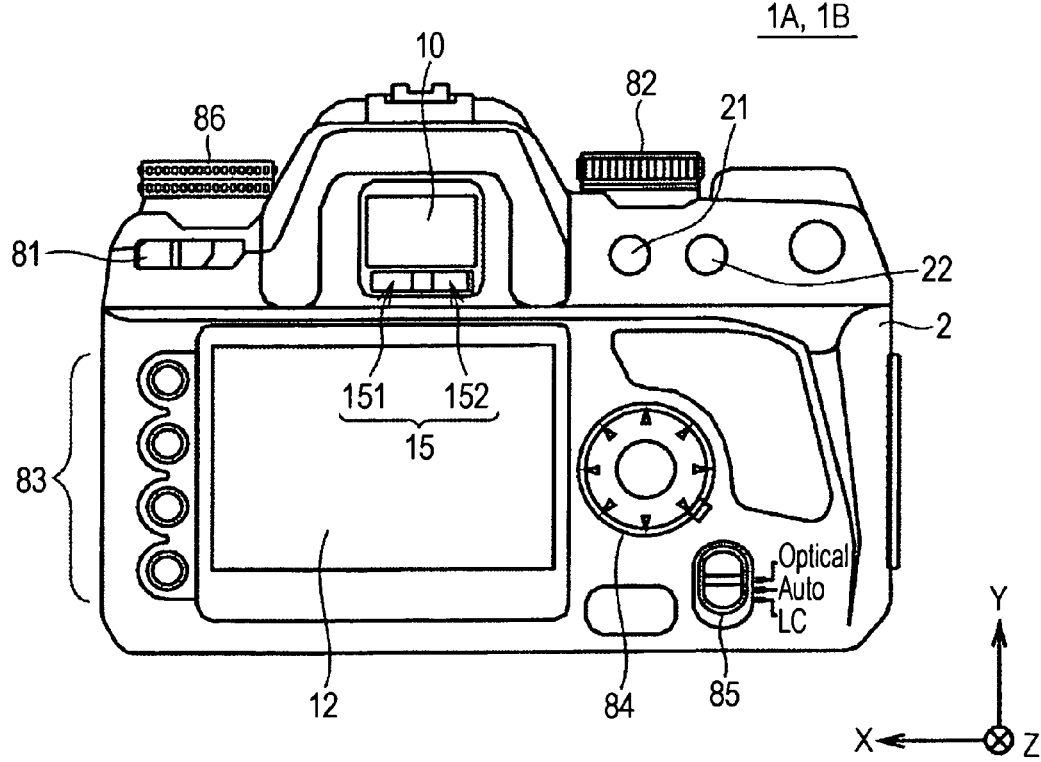
FIG. 2 is an external rear view of the image pickup apparatus according to the first embodiment of the present invention.

FIGS. 1 and 2 show examples of external configurations of an image pickup apparatus 1A according to a first embodiment of the present invention. FIG. 1 is an external front view of the image pickup apparatus 1A. FIG. 2 is an external rear view of the image pickup apparatus 1A. The image pickup apparatus 1A is a single-lens reflex digital camera with an interchangeable lens.

Referring to FIG. 1, the image pickup apparatus 1A has a camera body 2. An interchangeable lens 3, which is an interchangeable lens unit, is removably mounted to the camera body 2.

The interchangeable lens 3 mainly includes a lens barrel 36, a lens group 37 (refer to FIG. 3), and an aperture. The lens group 37 and the aperture are provided in the lens barrel 36. The lens group 37 (imaging optical system) includes a focus lens that is capable, of varying the zoom magnification concerning optical zoom and that moves in the direction of the optical axis to shift the focus position.

The camera body 2 has an annular mount unit Mt in a substantial central portion of the front face. The interchangeable lens 3 is mounted to the mount unit Mt. The camera body 2 also has a release button 89 used to remove the interchangeable lens 3 near the annular mount unit Mt.

The camera body 2 further has a mode setting dial 82 in an upper left portion of the front face and a control-value setting dial 86 in an upper right portion of the front face. A photographer can operate the mode setting dial 82 to set various modes of the camera (to perform switching between the various modes). The various modes include various image capturing modes (a person-image capturing mode, a landscape-image capturing mode, a full automatic image capturing mode, etc.), a playback mode in which a captured image is played back, and a communication mode in which data exchange with an external apparatus is performed. The photographer can operate the control-value setting dial 86 to set control values in the various image capturing modes.

The camera body 2 further has a grip unit 14 gripped by the photographer at the left end of the front face. A shutter release button 11 is provided on the top face of the grip unit 14. The shutter release button 11 is used by the photographer to instruct start of exposure. The grip unit 14 contains a battery storage box and a card storage slot. For example, an electric cell serving as the power supply of the camera is stored in the battery storage box. A memory card in which image data about captured images is recorded is removably stored in the card storage slot.

The shutter release button 11 is a two-stage detection button capable of detecting two states: a half-press state (S1 state) and a full-press state (S2 state). When the shutter release button 11 is half-pressed to be in the S1 state, the image pickup apparatus 1A performs preparation operations (for example, an AF control operation and an automatic exposure (AE) control operation) for acquiring a still image to be recorded (an image to be actually captured) of a subject. When the shutter release button 11 is further pressed to be in the S2 state, the image pickup apparatus 1A performs an image capturing operation of the image to be actually captured. Specifically, the image pickup apparatus 1A performs a series of operations including an exposure operation concerning an image of the subject (an optical image of the subject) with an image pickup device 5 described below and predetermined image processing for an image signal resulting from the exposure operation.

Referring to FIG. 2, a finder window (eyepiece window) 10 is provided at a substantial center of an upper area on the rear face of the camera body 2. The photographer can peep through the finder window 10 to visually recognize the optical image of the subject supplied from the interchangeable lens 3 and to determine the composition. In other words, the photographer can perform a composition determining operation by using an optical finder through which the optical image of the subject passing through the lens group 37 (refer to FIG. 3) is supplied to the finder window 10 (the composition determining operation will be described in detail below).

A detecting unit 15 including a light emitting device 151 emitting an infrared light and a light receiving device 152 is provided under the finder window 10. If the infrared light emitted from the light emitting device 151 is reflected from an eye of the photographer and the reflected light is detected by the light receiving device 152, the nearness of the eye of the photographer to the finder window 10 can be detected by the light emitting device 151 (detection of the nearness of an eye of the photographer).

Referring to FIG. 2, a liquid crystal monitor 12 is provided in a substantial central portion on the rear face of the camera body 2. The liquid crystal monitor 12 functions as a display device composed of, for example, a color liquid crystal display (LCD) and is capable of switching between a display ON state (display state) and a display OFF state (non-display state). A menu screen used for setting image capturing conditions can be displayed on the liquid crystal monitor 12 or a captured image recorded in the memory card can be played back and displayed on the liquid crystal monitor 12 in a playback mode. In addition, the live view display based on multiple time-series images (that is, a motion picture) captured by an image pickup device 7 described below can be performed on the liquid crystal monitor 12.

A main switch 81 is provided in an upper left portion with respect to the liquid crystal monitor 12. The main switch 81 is composed of a slide switch having two contacts. The image pickup apparatus 1A is turned off when the contact of the main switch 81 is set to an "OFF" position at the left side and the image pickup apparatus 1A is turned on when the contact of the main switch 81 is set an "ON" position at the right side.

A setting button group 83 including multiple buttons used for setting of the menu screen or deleting an image is provided on the left side of the liquid crystal monitor 12.

A direction selection key 84 is provided on the right side of the liquid crystal monitor 12. The direction selection key 84 has a circular operation button. Press operations in four directions including upward, downward, leftward, and rightward directions with the operation button and press operations in four directions including upper right, upper left, lower right, and lower left directions with the operation button are detected. In addition to the press operations in the eight directions, a press operation with a push button at the center of the direction selection key 84 can be detected.

The image pickup apparatus 1A according to the first embodiment can use a live view image (preview image) before the actual image capturing displayed in the liquid crystal monitor 12 to determine the composition (described in detail below).

A display selection switch 85 composed of a slide switch having three contacts is provided in a lower right portion with respect to the direction selection key 84. The photographer can use the display selection switch 85 to switch between the composition determination by the live view display (with an electronic finder) and the composition determination with the optical finder. Specifically, the composition determination with the optical finder is selected when the contact of the display selection switch 85 is set to an upper "Optical" position and the composition determination by the live view display (with the electronic finder) with the liquid crystal monitor 12 is selected when the contact of the display selection switch 85 is set to a lower "liquid crystal (LC)" position. When the contact of the display selection switch 85 is set to a central "Auto" position, the switching between the composition determination with the optical finder and the composition determination with the electronic finder is automatically performed depending on whether the nearness of an eye of the photographer is detected by the detecting unit 15.

The image pickup apparatus 1A has an electronic zoom function of zooming in or out an image of the subject displayed on the liquid crystal monitor 12 by performing signal processing to an image signal generated by the image pickup device 7 (refer to FIG. 4), specifically, by cutting out part of a captured image when the composition determination with the electronic finder is selected to perform the live view display. In the electronic zoom, zoom-in is performed in response to a press operation of a zoom-in button 21 provided in an upper right portion on the rear face of the image pickup apparatus 1A and zoom-out is performed in response to a press operation of a zoom-out button 22 provided in an upper right portion on the rear face of the image pickup apparatus 1A. Specifically, the image of the subject is magnified at a certain zoom magnification (for example, 0.2) each time the zoom-in button 21 is pressed, and the image of the subject is reduced in size at a certain zoom magnification (for example, 0.2) each time the zoom-out button 22 is pressed. The image of the subject can be reduced in size with the zoom-out button 22 from the state in which the electronic zoom is active to the magnification of the normal live view display, that is, to 1× magnification at which the electronic zoom is not performed. Switching between an electronic zoom active state in which the electronic zoom function is activated and an electronic zoom inactive state in which the electronic zoom function is inactivated can be performed with the zoom-in button 21 and the zoom-out button 22.

Figure 3:
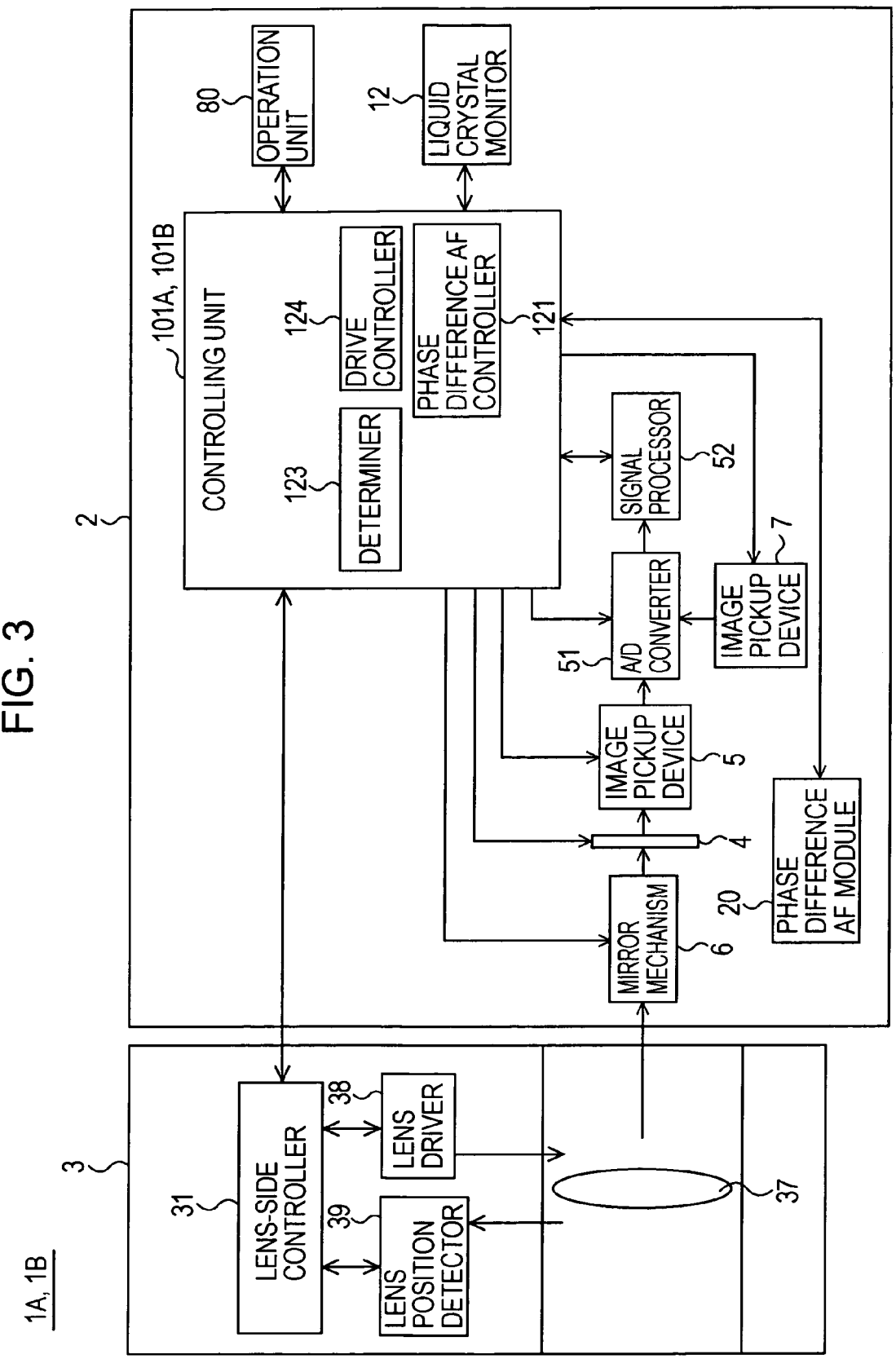
FIG. 3 is a block diagram showing an example of the functional configuration of the image pickup apparatus according to the first embodiment of the present invention.

An outline of the functional configuration of the image pickup apparatus 1A according to the first embodiment will now be described with reference to FIG. 3. FIG. 3 is a block diagram showing an example of the functional configuration of the image pickup apparatus 1A according to the first embodiment.

Referring to FIG. 3, the image pickup apparatus 1A includes an operation unit 80, a controlling unit 101A, a signal processor 52, and so on.

The operation unit 80 includes various buttons including the shutter release button 11 (refer to FIG. 1) and switches. The controlling unit 101A realizes various operations in response to input operations of the photographer with the operation unit 80.

The controlling unit 101A is composed of a microcomputer and mainly includes a central processing unit (CPU), a memory, and a read only memory (ROM). The controlling unit 101A is capable of acquiring data indicating the position of, for example, the focus lens, detected by a lens position detector 39 in the interchangeable lens 3, through a lens-side controller 31.

The controlling unit 101A reads out a program stored in the ROM and executes the program with the CPU to realize various functions. For example, the controlling unit 101A includes a phase difference AF controller 121, a determiner 123, and a drive controller 124 as the functional components.

The phase difference AF controller 121 controls a phase difference AF module 20 performing the focus detection in the phase difference detection (hereinafter also referred to as "phase difference AF") on the basis of an optical image of the subject supplied from a mirror mechanism 6 (described below). The determiner 123 determines the focus state of the subject on the basis of a signal output from the phase difference AF module 20 controlled by the phase difference AF controller 121.

The drive controller 124 drives and controls a lens driver 38 including an actuator via the lens-side controller 31 on the basis of the determination result in the determiner 123. As a result, focus control of the focus lens in the interchangeable lens 3 is performed on the basis of the result of the focus detection in the phase difference AF module 20. The image pickup device 5 and the image pickup device 7 can receive an optical image of the subject through the interchangeable lens 3 where the focus control of the focus lens is performed in the above manner to acquire the in-focus captured image.

Furthermore, the controlling unit 101A controls state switching between a state in which the mirror mechanism 6 is withdrawn from the optical path (a mirror-up state) and a state in which the mirror mechanism 6 blocks the optical path (a mirror-down state) and controls opening and closing of a shutter 4.

The image pickup device 5 is, for example, a complementary metal oxide semiconductor (CMOS) sensor. The image pickup device 5 converts an optical image of the subject into an electrical signal by photoelectric conversion to generate an image signal concerning the image to be actually captured (an image signal to be recorded). The image pickup device 5 serves as an image pickup device for acquiring an image to be recorded.

The image pickup device 5 performs the exposure (charge storage by the photoelectric conversion) to an image of the subject focused on the light receiving plane in response to drive control signals (a storage start signal and a storage end signal) supplied from the controlling unit 101A to generate an image signal concerning the image of the subject. The image pickup device 5 supplies the image signal to an analog-to-digital converter 51 in response to a readout control signal supplied from the controlling unit 101A.

The image signal acquired by the image pickup device 5 is converted into digital image data (image data) in the analog-to-digital converter 51. This image data is supplied to the signal processor 52.

The signal processor 52 performs digital signal processing to the image data supplied from the analog-to-digital converter 51 to generate image data concerning the captured image. The signal processor 52 performs image processing. For example, the signal processor 52 corrects the black level of each pixel data composing the image data supplied from the analog-to-digital converter 51 to a reference black level or adjusts the white balance of the image.

The image data subjected to digital signal processing in the signal processor 52 can be displayed on the liquid crystal monitor 12 through the controlling unit 101A. The image display includes confirmation display (after view) for confirming the captured image or playback display in which the captured image is played back.

The image pickup apparatus 1A also includes the image pickup device 7 (refer to FIG. 4), in addition to the image pickup device 5. The image pickup device 7 serves as an image pickup device for acquiring a live view image (for the electronic finder). Specifically, the image pickup device 7 generates an image signal concerning an optical image of the subject reflected from a primary mirror 61 (refer to FIG. 4) through the lens group 37. The live view display (the preview display before the actual image capturing) based on the image signals of the subject sequentially generated by the image pickup device 7 is performed on the liquid crystal monitor 12 to realize the electronic finder function in the image pickup apparatus 1A.

The image pickup device 7 has a configuration similar to that of the image pickup device 5. However, the image pickup device 7 is normally composed of pixels of a number smaller than the number of pixels of the image pickup device 5 because it is sufficient for the image pickup device to have a resolution at which the image signals (motion picture) for the live view display can be generated.

Signal processing similar to that performed to the image signal acquired by the image pickup device 5 is performed also to the image signal acquired by the image pickup device 7. Specifically, the image signal acquired by the image pickup device 7 is converted into digital data in the analog-to-digital converter 51 and is subjected to digital signal processing in the signal processor 52.

The controlling unit 101A displays an image based on the time-series image data acquired by the image pickup device 7 on the liquid crystal monitor 12. This realizes the display in the motion picture mode (the live view display) for determining the composition.

The composition determining operation (framing operation) in the image pickup apparatus 1A according to the first embodiment will now be described. As described above, the image pickup apparatus 1A is capable of determining the composition (framing) by using the optical finder (also called an optical viewfinder (OVF)) composed of the finder optical system etc. and is also capable of determining the composition by using a live view image displayed on the liquid crystal monitor 12 (the composition determination with the electronic finder).

Figure 4:
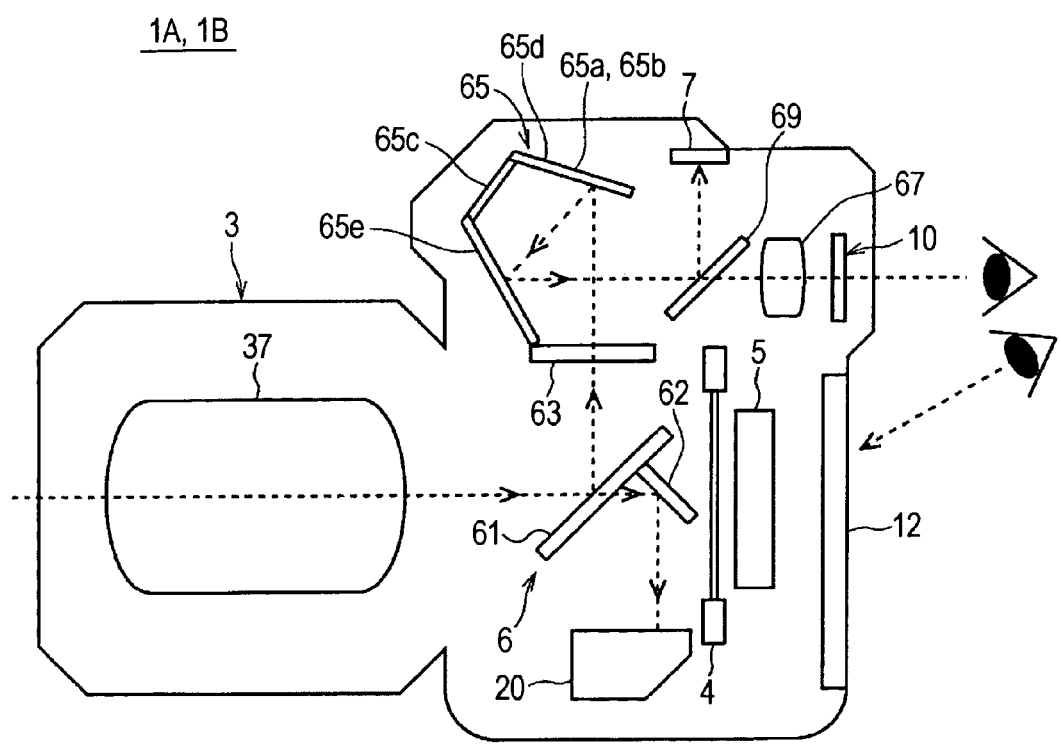
FIG. 4 is a vertical cross-sectional view of the image pickup apparatus according to the first embodiment of the present invention.

FIG. 4 is a vertical cross-sectional view of the image pickup apparatus 1A.

Referring to FIG. 4, the mirror mechanism 6 is provided on the optical path (image-capturing optical path) from the interchangeable lens 3 to the image pickup device 5. The mirror mechanism 6 includes the primary mirror 61 (primary reflection plane) reflecting a light from the imaging optical system upward. All or art of the primary mirror 61 is composed of, for example, a half mirror, through which part of the light from the imaging optical system is transmitted. The mirror mechanism 6 also includes a sub-mirror 62 (secondary reflection plane) reflecting the light transmitted through the primary mirror 61 downward. The light reflected downward by the sub-mirror 62 is incident on the phase difference AF module 20 to be used for the phase difference AF operation. Before the shutter release button 11 is in the full-press state (S2 state) in the image capturing mode, that is, in the composition determination, the mirror mechanism 6 is arranged so as to be in the mirror-down state (the state shown in FIG. 4). In this state, an image of the subject from the interchangeable lens 3 is reflected upward by the primary mirror 61 and is incident on a pentamirror 65 as a light flux for observation. The pentamirror 65 includes multiple mirrors (reflection planes) and has a function of adjusting the direction of the image of the subject.

When the shutter release button 11 is in the full-press state (S2 state), the mirror mechanism 6 is driven so as to be in the mirror-up state and the exposure operation is started. The operation for acquiring a still image to be recorded (also referred to as "an image to be actually captured") concerning the subject, that is, the operation for the exposure is common to the composition determination methods by using the optical finder and the electronic finder. The operations performed in the composition determination methods by using the optical finder and the electronic finder will now be described.

First, the operation for the composition determination by using the optical finder will now be described.

As shown in the example in FIG. 4, when the primary mirror 61 and the sub-mirror 62 in the mirror mechanism 6 are arranged on the optical path of an image of the subject from the interchangeable lens 3, the image of the subject is led to the finder window 10 through the primary mirror 61, the pentamirror 65, a half mirror 69, and an eyepiece 67.

Specifically, a light from the interchangeable lens 3 is reflected from the primary mirror 61 to change the course of the light to an upward direction, is focused on a focusing plate 63, and passes through the focusing plate 63. After the course of the light passing through the focusing plate 63 is changed by the pentamirror 65, the light is transmitted through the half mirror 69 and is led to the finder window 10 through the eyepiece 67. The image of the subject passing through the finder window 10 reaches an eye of the photographer (the observer) who visually recognizes the image of the subject. In other words, the photographer can confirm the image of the subject by peeping through the finder window 10.

The pentamirror 65 includes two mirrors (penta-dach mirrors) 65a and 65b formed in a delta roof, a plane 65c fixed to the penta-dach mirrors (dach planes) 65a and 65b, and another mirror (reflection plane) 65e. The delta-roof penta-dach mirrors 65a and 65b are formed as an integrated part 65d by plastic molding. The light reflected by the primary mirror 61 to change the course of the light to the upward direction is reflected by the penta-dach mirrors 65a and 65b to laterally invert the courses of the reflected light components. The light components are further reflected by the mirror 65e to vertically invert the courses of the reflected light components and the light components whose courses are vertically inverted reaches an eye of the photographer. The optical image laterally and vertically inverted by the interchangeable lens 3 is further laterally and vertically inverted by the pentamirror 65 in the above manner. As a result, the photographer can observe the image of the subject in the state in which the lateral and vertical states of the image of the subject are the same as those of the actual subject in the optical finder.

Next, the operation for the composition determination by using the electronic finder will now be described.

Also in this case, as shown in the example in FIG. 4, the primary mirror 61 and the sub-mirror 62 in the mirror mechanism 6 are arranged on the optical path of an image of the subject from the interchangeable lens 3. The light from the interchangeable lens 3 is reflected from the primary mirror 61 to change the course of the light to an upward direction, is focused on the focusing plate 63, and passes through the focusing plate 63. The course of the light passing through the focusing plate 63 is changed by the pentamirror 65 and is led to the finder window 10.

However, in the composition determination by using the electronic finder, the course of the light that has been changed by the pentamirror 65 is changed to an upward direction by the half mirror 69 and is focused again on the image capturing plane of the image pickup device 7.

The image pickup device 7 generates a live view image on the basis of the image of the subject that has been reflected by the half mirror 69 and has reached the image pickup device 7. Specifically, the image pickup device 7 receives the light flux (the light flux for observation) reflected by the primary mirror 61 and sequentially generates multiple image signals at very short time intervals (for example, 1/60 seconds). The time-series image signals that are acquired are sequentially displayed on the liquid crystal monitor 12 (live view display). The photographer can visually recognize the motion picture (live vies images) displayed on the liquid crystal monitor 12 to determine the composition by using the motion picture. In the composition determination by using the electronic finder, the photographer can operate the zoom-in button 21 etc. described above to electronically zoom in or out the image of the subject displayed on the liquid Crystal monitor 12.

In the composition determination by using the electronic finder and the optical finder, the light transmitted through the primary mirror 61 is reflected by the sub-mirror 62, the course of the light is changed to a downward direction, and the light is incident on the phase difference AF module 20. The phase difference AF module 20, the controlling unit 101A, etc. use the light entering through the primary mirror 61 and the sub-mirror 62 to realize the AF operation. In the AF operation, the phase difference AF controller 121 in the controlling unit 101A controls the phase difference AF module 20 in accordance with the electronic zoom magnification. The control of the phase difference AF module 20 will be described next.

The image pickup apparatus 1A according to the first embodiment is configured such that the accuracy of the focus detection (phase difference AF) in the phase difference AF module 20 can be changed depending on the electronic zoom magnification in the composition determination by using the electronic finder, that is, in the live view display on the liquid crystal monitor 12. The change of the accuracy of the focus detection in the phase difference AF module 20 will now be described.

Figure 5:
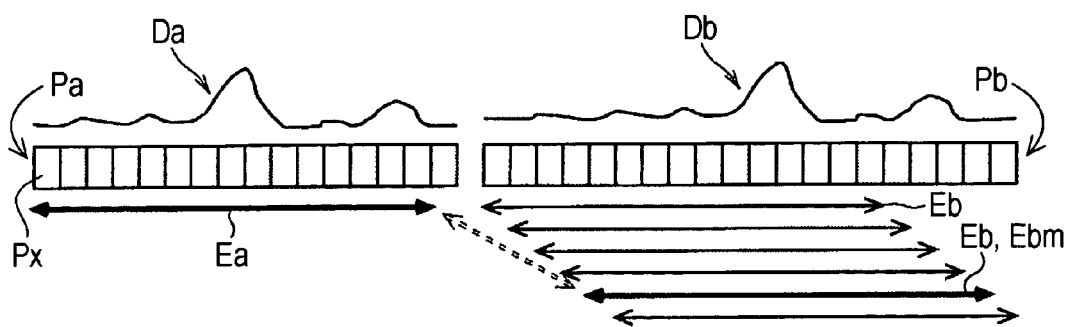
FIG. 5 is a diagram for description of the principle of focus detection in phase difference detection in a phase difference AF module in the image pickup apparatus according to the first embodiment of the present invention.

FIG. 5 is a diagram for description of the principle of the focus detection in the phase difference detection in the phase difference AF module 20.

The phase difference AF module 20 includes a criterion part Pa and a reference part Pb each serving as a licenser. Pixels Pxs in which charge is stored in accordance with the amount of received light by the photoelectric conversion are one-dimensionally and linearly arranged in the criterion part Pa and the reference part Pb. Optical images Da and Db of two subjects, generated by a separator lens or the like provided in the phase difference AF module 20, are led to the criterion part Pa and the reference part Pb.

In the phase difference AF module 20 having the above configuration, the amount of shift in the direction in which the pixels are arranged between the optical image Da detected by the criterion part Pa and the optical image Db detected by the reference part Pb can be detected to perform the focus detection in the phase difference detection.

In order to detect the amount of shift between the optical image Da and the optical image Db, a detection section (detection block) Ea and detection sections (detection blocks) Eb composed of the continuous pixels of the same number (15 pixels in the example in FIG. 5) are set in the criterion part Pa and the reference part Pb, respectively. In addition, it is necessary to perform correlation calculation based on the luminance distribution of the optical image Da detected in the detection section Ea set in the criterion part Pa and the luminance distribution of the optical image Db detected in the set position of each detection section Eb set in the reference part Pb to determine the position of the detection section Eb in the reference part Pb having the highest correlation value (level of similarity). The detection sections Eb are sequentially shifted by one pixel in the reference part Pb. For example, in the example in FIG. 5, a detection section Ebm shifted from the leftmost position by four pixels in the reference part Pb has the highest correlation value.

Figure 6:
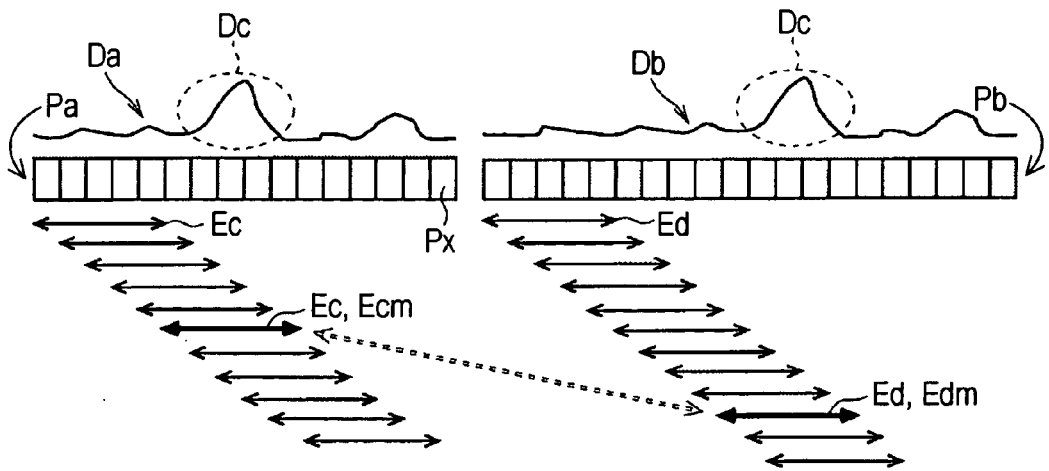
FIG. 6 is a diagram for description of control of the phase difference AF module in the image pickup apparatus according to the first embodiment of the present invention.

When the focus detection in the phase difference detection is performed in the above manner on the basis of the optical images Da and Db of the subject detected in each of the detection section Ea and the detection sections Eb having the same section length, set in the criterion part Pa and the reference part Pb, respectively, in the phase difference AF module 20, shortening the section length of the detection section Ea and the detection sections Eb allows the accuracy of the focus detection to be improved. For example, detection sections Ec and detection sections Ed including the pixels of a number (five pixels in the example shown in FIG. 6) sufficient to cover characteristic portions Dcs where the difference in luminance between the pixels is large in the luminance distributions of the optical images Da and Db can be set in the optical image Da and the optical image Db as shown in FIG. 6 to perform the more accurate focus detection. In the example shown in FIG. 6, the luminance distribution of the optical image Da detected while shifting the detection section Ec in the criterion part Pa by one pixel can be compared with the luminance distribution of the optical image Db detected while shifting the detection section Ed in the criterion part Pb by one pixel to detect that the highest correlation is found between a detection section Ecm (the detection section shifted from the leftmost position by five pixels) in the criterion part Pa, in which the luminance distribution of the characteristic portion Dc in the optical image Da is detected, and a detection section Edm (the detection section shifted from the leftmost position by nine pixels) in the reference part Pb, in which the luminance distribution of the characteristic portion Dc in the optical image Db is detected. When the number of pixels in the detection sections Ec and Ed is decreased, the count of shifts in the detection sections Ec and Ed is preferably increased. This can detect the optical images Da and Db across the pixel arrangement of the criterion parts Pa and Pb even if the section length of the detection sections Ec and Ed is shortened.

As described above, shortening the section length set in the criterion parts Pa and Pb allows the accuracy of the focus detection in the phase difference AF module 20 to be improved.

Figure 7A:
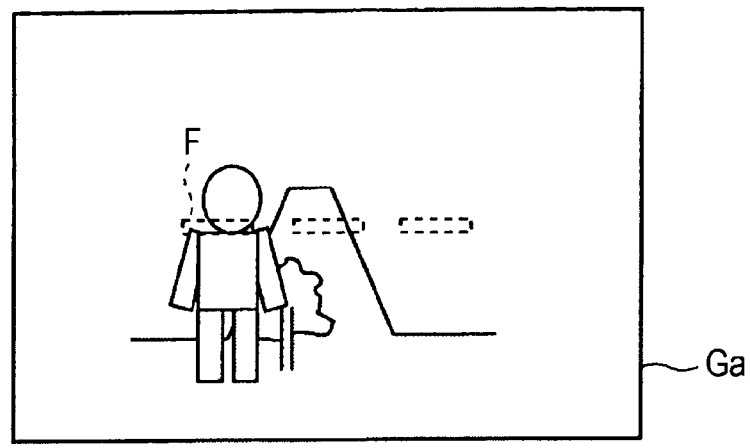
FIGS. 7A and 7B are diagrams for description of the control of the phase difference AF module in the image pickup apparatus according to the first embodiment of the present invention.
Figure 7B:
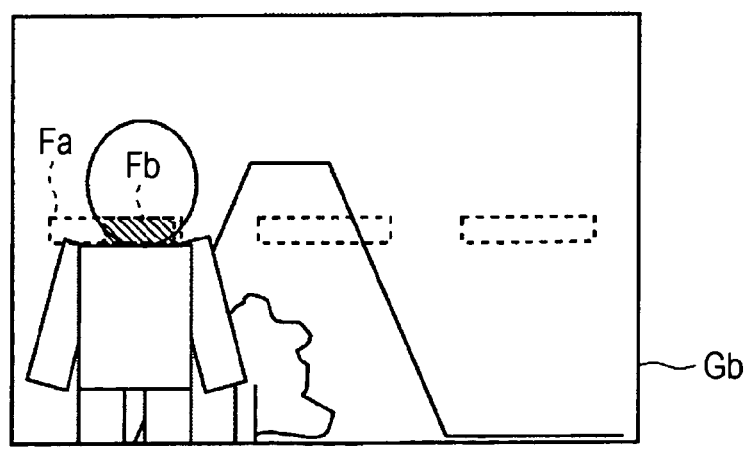

When an image of the subject displayed on the liquid crystal monitor 12 is enlarged by the electronic zoom in the live view display, it is easy to determine the degree of in-focus in the image of the subject. For example, it is easy to visually recognize detailed parts of a subject image Gb (FIG. 7B) that is zoomed in by pressing the zoom-in button 21 for a subject image Ga displayed on the liquid crystal monitor as shown in FIG. 7A. Accordingly, the photographer can aware of defocusing of the zoomed-in subject image Gb if out-of focus due to the phase difference AF is detected in the subject image Gb. The photographer who has recognized such an out-of focus state can feel uneasy about the focus control.

In order to resolve such a problem, in the image pickup apparatus 1A according to the first embodiment, the number of pixels in the detection sections Ec and Ed in the criterion parts Pa and Pb in the phase difference AF module 20 is decreased in the above manner in the zooming-in of a live view image by the electronic zoom in order to improve the accuracy of the focus detection in the phase difference AF. In other words, the section length of the detection section in the electronic zoom active state is made shorter than that of the detection section in the electronic zoom inactive state to make the out-of focus in the zoomed-in subject image Gb invisible. Shortening the detection section corresponds to the fact that a focus detection area F in the phase difference AF module 20 set in the subject image Ga (FIG. 7A) in the electronic zoom inactive state is not set to a focus detection area Fa having the length in proportion to the zoom magnification but is set to a focus detection area Fb (shaded area) having the length shorter than that of the focus detection area Fa in the subject image Gb (FIG. 7B) in the electronic zoom active state.

An exemplary specific operation of the image pickup apparatus 1A in which the phase difference AF module 20 is controlled in the above manner will now be described.

Figure 8:
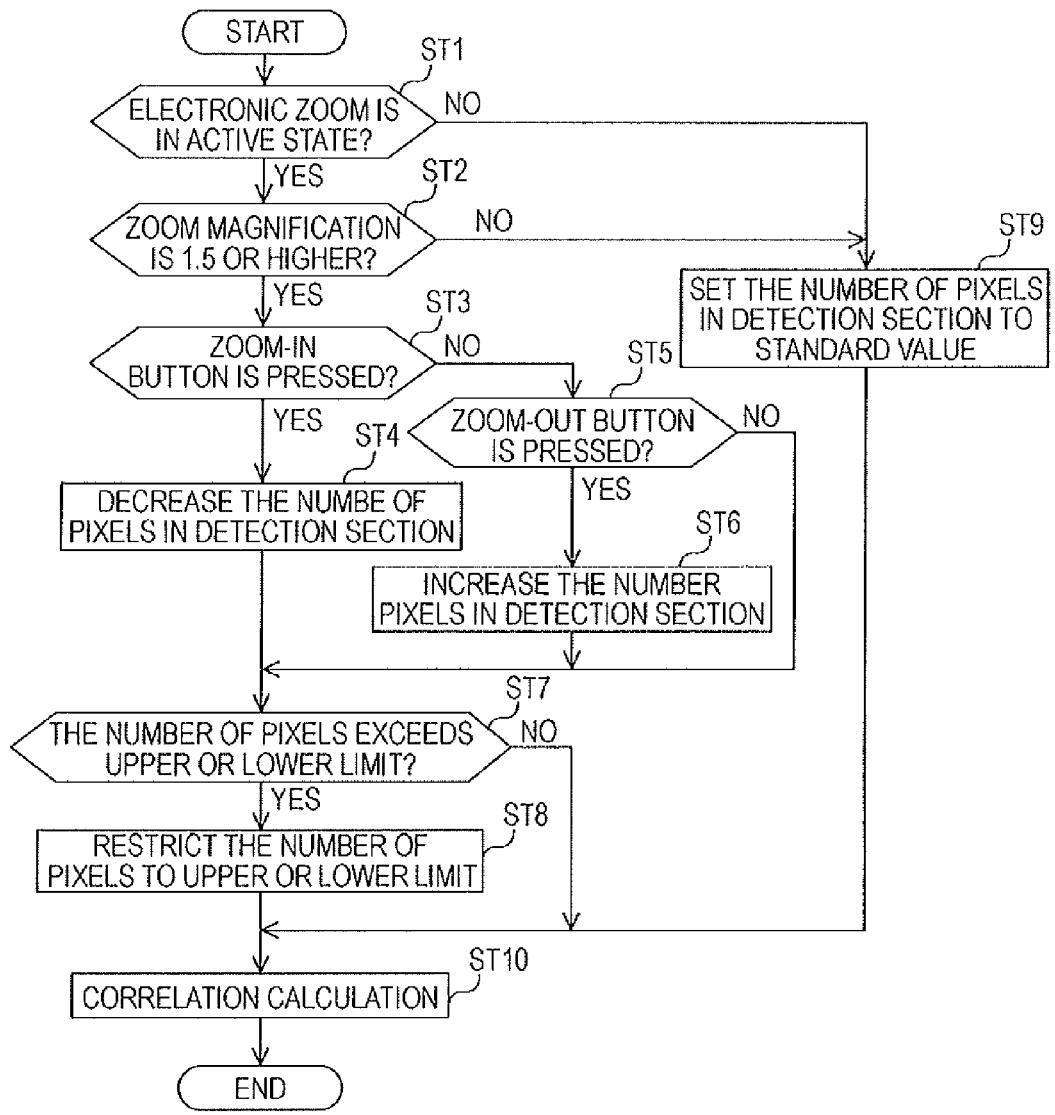
FIG. 8 is a flowchart showing an example of the basic operation of the image pickup apparatus according to the first embodiment of the present invention.

FIG. 8 is a flowchart showing an example of the basic operation of the image pickup apparatus 1A according to the first embodiment. This basic operation indicates an operation concerning the control of the phase difference AF module 20 in accordance with the electronic zoom operation in the live view display and is performed by the controlling unit 101A.

Referring to FIG. 8, in Step ST1, the controlling unit 101A determines whether the electronic zoom is in the active state. Specifically, the controlling unit 101A determines whether the zoom-in button 21 is pressed by the photographer in the live view display to zoom in an image of a subject displayed on the liquid crystal monitor 12 by the electronic zoom. If the electronic zoom is in the active state, the operation proceeds to Step ST2. If the electronic zoom is in the inactive state, the operation proceeds to Step ST9.

In Strep ST2, the controlling unit 101A determines whether the zoom magnification concerning the electronic zoom is 1.5 or higher. If the zoom magnification is 1.5 or higher, the operation proceeds to Step ST3. If the zoom magnification is lower than 1.5, the operation proceeds to Step ST9. In Step ST3, the controlling unit 101A determines whether the zoom-in button 21 is pressed by the photographer. If the zoom-in button 21 is pressed, the operation proceeds to Step ST4. If the zoom-in button 21 is not pressed, the operation proceeds to Step ST5.

In Step ST4, the controlling unit 101A decreases the number of pixels in the detection sections Ec and Ed (FIG. 6) set in the criterion parts Pa and Pb, respectively, in the phase difference AF module 20. For example, the number of pixels is decremented by one each time the zoom-in button 21 is pressed.

In addition, each time the number of pixels in the detection sections Ec and Ed is decremented by one in Step ST4, the count of shifts in the detection sections Ec and Ed in the criterion parts Pa and Pb is incremented, for example, by one.

In other words, the count of shifts in the detection sections Ec and Ed in the electronic zoom active state is set to a value higher than that in the detection sections Ec and Ed in the electronic zoom inactive state.

In Step ST5, the controlling unit 101A determines whether the zoom-out button 22 is pressed by the photographer. If the zoom-out button 22 is pressed, the operation proceeds to Step ST6. If the zoom-out button 22 is not pressed, the operation proceeds to Step ST7.

In Step ST6, the controlling unit 101A increases the number of pixels in the detection sections Ec and Ed (FIG. 6) set in the criterion parts Pa and Pb, respectively, in the phase difference AF module 20. For example, the number of pixels is incremented by one each time the zoom-out button 22 is pressed.

In addition, each time the number of pixels in the detection sections Ec and Ed is incremented by one in Step ST6, the count of shifts in the detection sections Ec and Ed in the criterion parts Pa and Pb is decremented, for example, by one.

In Step ST7, the controlling unit 101A determines whether the number of pixels in the detection sections Ec and Ed decreased in Step ST4 or increased in Step ST6 exceeds a lower or upper limit, respectively. Specifically, the controlling unit 101A determines whether the number of pixels in the detection sections Ec and Ed decreased in Step ST4 is lower than a predetermined lower limit Kmin or the number of pixels in the detection sections Ec and Ed increased in Step ST6 is higher than a predetermined upper limit Kmax. If the number of pixels in the detection sections Ec and Ed exceeds the lower limit Kmin or the upper limit Kmax, the operation proceeds to Step ST8. If the number of pixels in the detection sections Ec and Ed does not exceed the lower limit Kmin or the upper limit Kmax, the operation proceeds to Step ST10.

In Step ST8, the controlling unit 101A restricts the number of pixels in the detection sections Ec and Ed to the lower or upper limit. Specifically, the controlling unit 101A sets the number of pixels in the detection sections Ec and Ed to the lower limit Kmin if the controlling unit 101A determines in Step ST7 that the number of the pixels in the detection sections Ec and Ed is lower than the lower limit Kmin, and the controlling unit 101A sets the number of pixels in the detection sections Ec and Ed to the upper limit Kmax if the controlling unit 101A determines in Step ST7 that the number of the pixels in the detection sections Ec and Ed is higher than the upper limit Kmax.

In Step ST9, the controlling unit 101A sets the number of pixels in the detection sections Ec and Ed to a standard value. For example, the controlling unit 101A sets the number of pixels in the detection sections Ec and Ed to the number of pixels (for example, the upper limit Kmax) when the 1× magnification live view display is performed in the electronic zoom inactive state.

In Step ST10, the controlling unit 101A performs the correlation calculation in the phase difference AF module 20 in the detection sections Ec and Ed having the number of pixels set in Step ST4, ST6, or ST9. For example, the controlling unit 101A performs the correlation calculation based on the luminance distribution of the optical image Da detected while shifting the detection section Ec in the criterion part Pa by one pixel, in the manner shown FIG. 6, and the luminance distribution of the optical image Db detected while shifting the detection section Ed in the criterion part Pb by one pixel to determine the detection section Edm in the reference part Pb, which has the highest correlation value to the detection section Ecm in the criterion part Pa. As a result, the difference in phase between the criterion part Pa and the reference part Pb can be detected to appropriately perform the phase difference AF.

The image pickup apparatus 1A decreases the number of pixels in the detection sections Ec and Ed set in the criterion parts Pa and Pb, respectively, in the phase difference AF module 20 in response to the zoom-in by the electronic zoom in the above manner, so that the accuracy of the focus detection in the phase difference AF is improved to make the out-of focus in the zoomed-in subject image invisible. In other words, it is possible to perform the appropriate focus detection in the phase difference detection in accordance with the zoom state by the electronic zoom.

Figure 9:
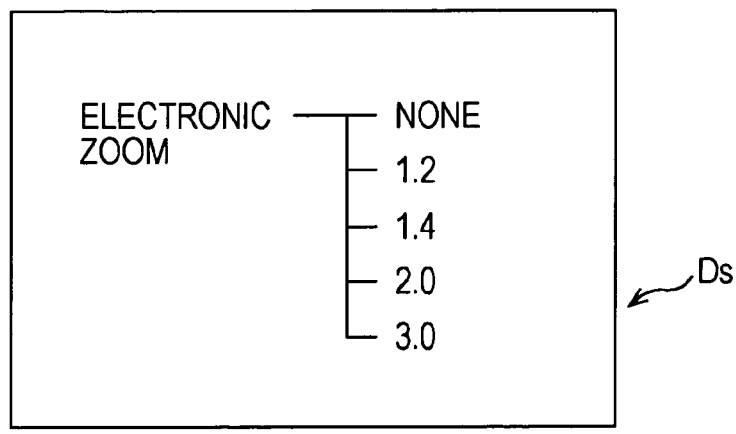
FIG. 9 is a diagram for description of an example concerning setting of an electronic zoom magnification.

The magnification of the electronic zoom may not necessarily be set with the zoom-in button 21 and the zoom-out button 22 in the image pickup apparatus 1A. For example, a user interface Ds shown in FIG. 9 may be displayed on the liquid crystal monitor 12 and the magnification of the electronic zoom may be set in the user interface Ds with the direction selection key 84 or the like.

Figure 10:
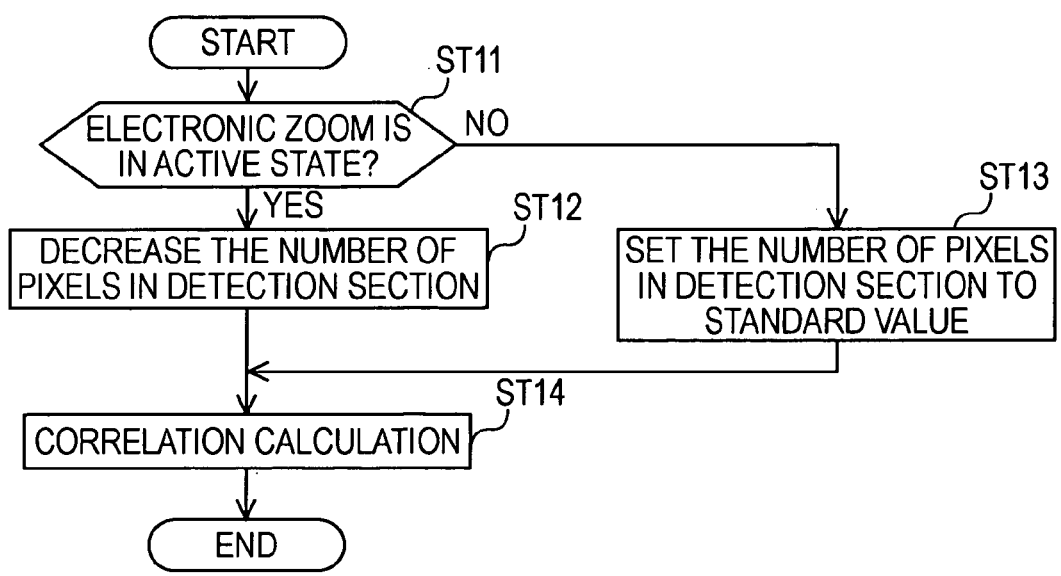
FIG. 10 is a flowchart showing an exemplary operation in accordance with an "ON" state and an "OFF" state of electronic zoom.

The image pickup apparatus 1A may not necessarily adopt the configuration in which the magnification of the electronic zoom is varied stepwise. Alternatively, an "ON" state or an "OFF" state of the electronic zoom may be selected to switch between 1× magnification and a predetermined magnification (for example, 2× magnification). In this case, for example, the zoom-out button 22 may be removed and the zoom-in button 21 may be used as an electronic zoom switch button used for switching between the "ON" state and the "OFF" state of the electronic zoom. FIG. 10 is a flowchart showing an exemplary operation of an image pickup apparatus provided with such an electronic zoom switching button.

Referring to FIG. 10, in Step ST11, the image pickup apparatus determines whether the electronic zoom is in the active state. Specifically, the image pickup apparatus determines whether the electronic zoom switching button is pressed to set the electronic zoom to the "ON" state. If the electronic zoom is in the active state, the operation proceeds to Step ST12. If the electronic zoom is in the inactive state, the operation proceeds to Step ST13.

In Steps ST12, ST13, and ST14, the image pickup apparatus performs steps similar to Steps ST4, ST9, and ST10 in the flowchart shown in FIG. 8.

The image pickup apparatus can perform the operation described above to make the out-of focus in the subject image that is zoomed in by the electronic zoom invisible and to perform the appropriate focus detection in the phase difference detection.

Second Embodiment

Although an image pickup apparatus 1B according to a second embodiment of the present invention has an external configuration similar to that of the image pickup apparatus 1A according to the first embodiment of the present invention shown in FIGS. 1 and 2, the image pickup apparatus 1B according to the second embodiment differs from the image pickup apparatus 1A according to the first embodiment in the configuration of a controlling unit in the functional configuration shown in FIG. 3.

Specifically, a program controlling the phase difference AF module 20 differently from the first embodiment is stored in a controlling unit 101B in the image pickup apparatus 1B. The control of the phase difference AF module 20 in the image pickup apparatus 1B will now be described in detail.

The image pickup apparatus 1B according to the second embodiment can vary the number of pixels in the detection sections in the criterion parts Pa and Pb in the phase difference AF module 20 in accordance with the optical zoom magnification of the interchangeable lens 3 when the electronic finder is used (in the live view display) or when the optical finder is used.

Specifically, the image pickup apparatus 1A according to the first embodiment decreases the number of pixels in the detection sections in the phase difference AF module 20 in order to make out-of focus in a subject image displayed on the liquid crystal monitor 12 invisible when the subject image is zoomed in by the electronic zoom in the live view display. In contrast, the image pickup apparatus 1B according to the second embodiment decreases the number of pixels in the detection sections in the phase difference AF module 20 because the mixture of near and far subjects can possibly occur when a subject image is zoomed out by the optical zoom. Such control of the phase difference AF module 20 will now be described.

Figure 11:
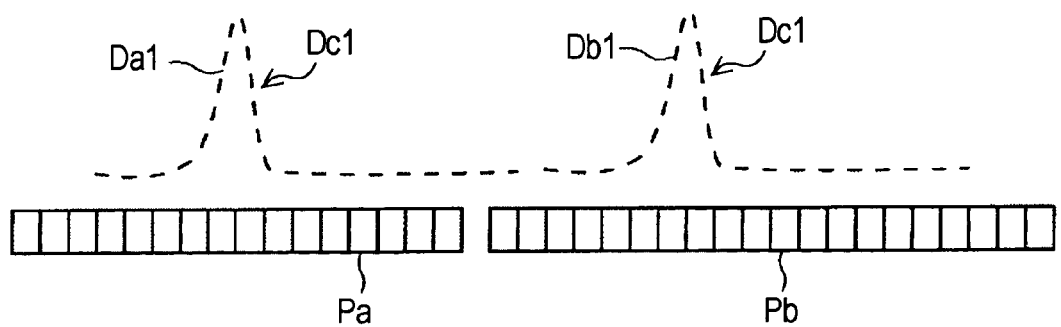
FIG. 11 is a diagram for description of mixture of near and far subjects.
Figure 12:
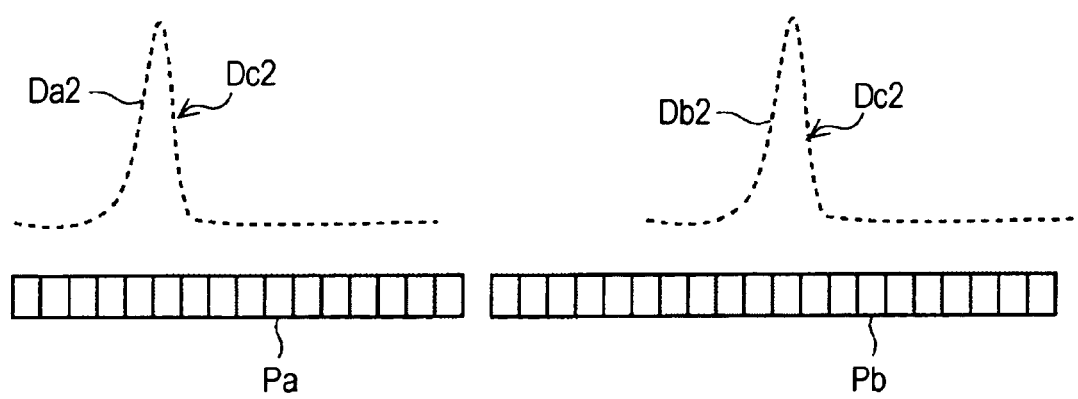
FIG. 12 is another diagram for description of the mixture of near and far subjects.
Figure 13:
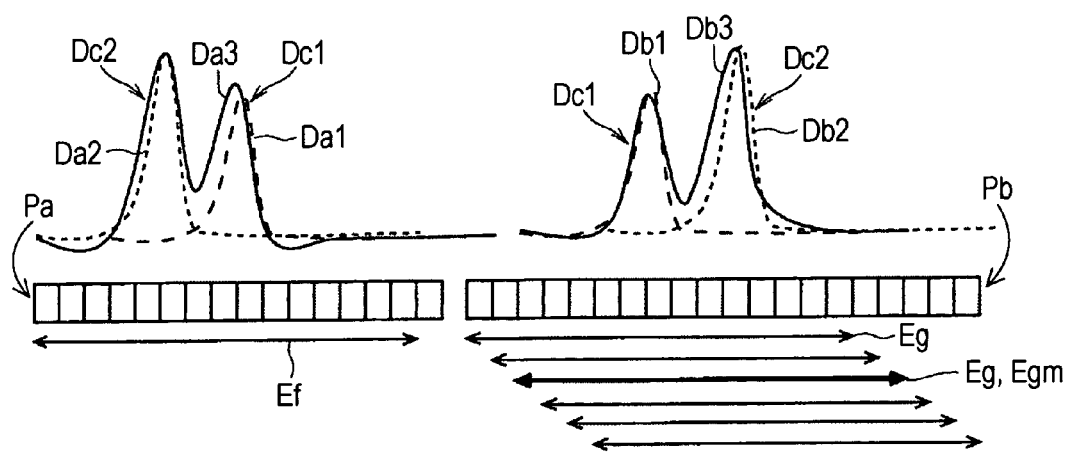
FIG. 13 is another diagram for description of the mixture of near and far subjects.

FIGS. 11 to 13 are diagrams for description of the mixture of near and far subjects.

When an optical image of a subject relatively near the image pickup apparatus 1B (a near-side subject) is received in the criterion part Pa and the reference part Pb in the phase difference AF module 20, for example, optical images Da1 and Db1 shown in FIG. 11 are detected. In contrast, when an optical image of a subject relatively far from the image pickup apparatus 1B (a far-side subject) is received in the criterion part Pa and the reference part Pb in the phase difference AF module 20, for example, optical images Da2 and Db2 shown in FIG. 12 are detected.

In a state where both the near-side subject and the far-side subject exist (in the state of mixture of near and far subjects), the optical images Da1 and Db1 shown in FIG. 11 are superimposed on the optical images Da2 and Db2 shown in FIG. 12 to produce optical images Da3 and Db3 shown by solid lines in FIG. 13.

When the focus detection is performed for the optical images Da1 and Db1 shown in FIG. 11 and the optical images Da2 and Db2 shown in FIG. 12, it is possible to appropriately perform the correlation calculation in the phase difference AF even if the number of pixels in the detection sections Ea and Eb set in the criterion parts Pa and Pb, respectively, is relatively large as in the example shown in FIG. 5 because the optical images Da1 and Db1 have simple luminance distributions each having only one characteristic portion Dc1 where the difference in luminance between the pixels is relatively large and the optical images Da2 and Db2 also have simple luminance distributions each having only one characteristic portion Dc2 where the difference in luminance between the pixels is relatively large.

In contrast, in the optical images Da3 and Db3 in the state of mixture of near and far subjects shown in FIG. 13, the positional relationship between the characteristic portion Dc1 of the optical image Da1 concerning the near-side subject and the characteristic portion Dc2 of the optical image Da2 concerning the far-side subject in the optical image Da3 is reversed with the positional relationship between the characteristic portion Dc1 of the optical image Db1 concerning the near-side subject and the characteristic portion Dc2 of the optical image Db2 concerning the far-side subject in the optical image Db3. When detection sections Ef and Eg having a larger number of pixels are set in the criterion parts Pa and Pb, respectively in such a state of mixture of near and far subjects to perform the correlation calculation, a detection section Egm of the reference part Pb has the highest correlation with the detection section Ef of the criterion part Pa, as shown in FIG. 13. The phase difference AF by using the detection section Egm results in in-focus at a position between the near-side subject and the far-side subject, thus undesirably performing the inappropriate focus detection.

Accordingly, when the focus detection is performed in the state of mixture of near and far subjects, the number of pixels in the detection sections in the criterion parts Pa and Pb is decreased, as in the first embodiment, in order to perform the focus detection for the near-side subject separately from the focus detection for the far-side subject. Such control of the phase difference AF module 20 will now be described with reference to FIG. 14.

Figure 14:
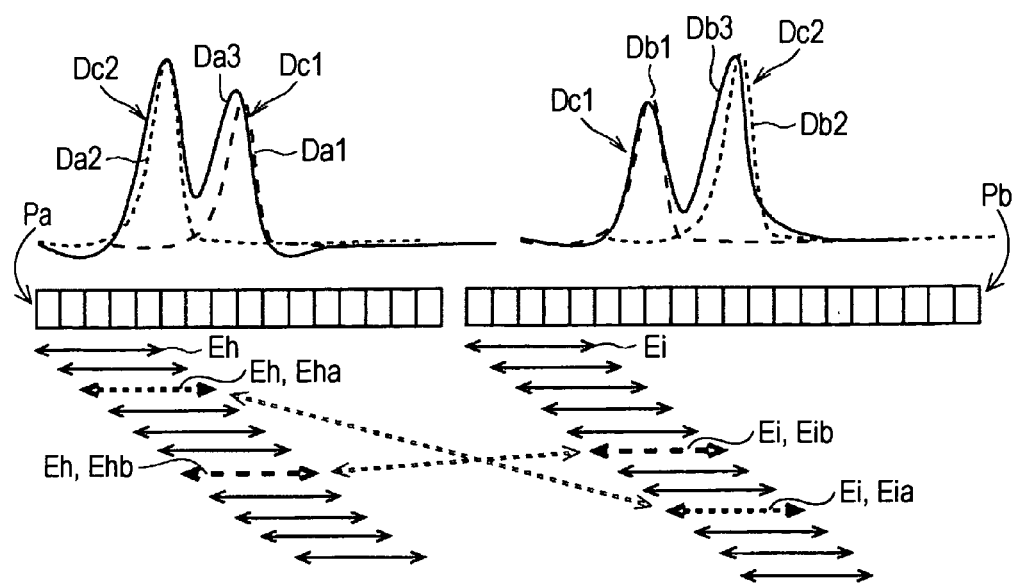
FIG. 14 is a diagram for description of control of a phase difference AF module in an image pickup apparatus according to a second embodiment of the present invention.

FIG. 14 is a diagram for description of the control of the phase difference AF module 20 in the image pickup apparatus 1B according to the second embodiment.

The number of pixels in detection sections Eh and Ei in the criterion parts Pa and Pb, respectively, shown in FIG. 14 is smaller than that in the detection sections Ef and Eg in the criterion parts Pa and Pb, respectively, shown in FIG. 13. Consequently, it is possible to detect a detection section Eia in the reference part Pb having the highest correlation with a detection section Eha in the criterion part Pa receiving the characteristic portion Dc2 in the luminance distribution concerning the far-side subject and it is also possible to detect a detection section Eib in the reference part Pb having the highest correlation with a detection section Ehb in the criterion part Pa receiving the characteristic portion Dc1 in the luminance distribution concerning the near-side subject. Since the focus detection for the near-side subject can be performed separately from the focus detection for the far-side subject, it is possible to prevent in-focus at a point between the near-side subject and the far-side subject. For example, the phase difference AF with priority given to the near-side subject allows the person (the near-side subject) to be appropriately focused on without being affected by the background (the far-side subject).

Figure 15A:
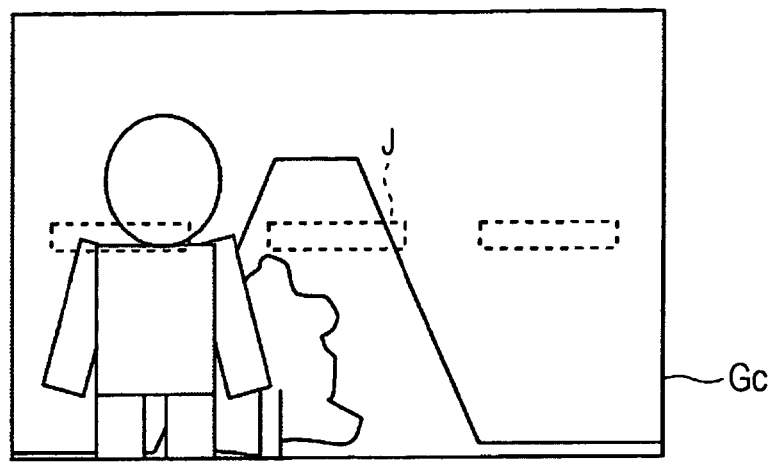
FIGS. 15A and 15B are diagrams for description of the control of the phase difference AF module in the image pickup apparatus according to the second embodiment of the present invention.
Figure 15B:
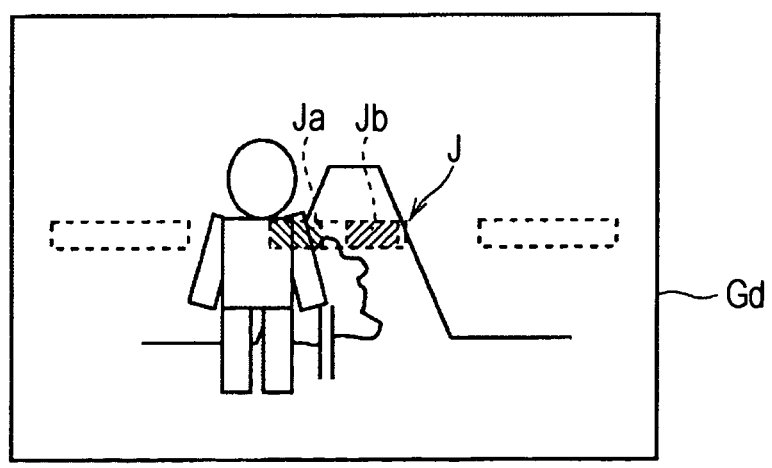

Such a state of mixture of near and far subjects has a higher possibility of occurrence when the optical zoom magnification in the interchangeable lens 3 is decreased. For example, when the electronic zoom in the live view display results in a too-large subject in a displayed image Gc on the liquid crystal monitor 12, as shown in FIG. 15A, the photographer generally decreases the optical zoom magnification as an operation for fine tuning of the size of the subject. This operation can result in the state of mixture of near and far subjects in a focus detection area J in the phase difference AF module 20, as shown in FIG. 15B. However, the detection sections having a decreased number of pixels can be set to perform the focus detection for the near-side subject (a person) separately from the focus detection for the far-side subject (a mountain), thus enabling the appropriate phase difference AF. For example, focus detection areas Ja and Jb having lengths shorter than the length of the focus detection area J are set, as in the example shown in FIG. 15B.

An exemplary specific operation of the image pickup apparatus 1B in which the phase difference AF module 20 is controlled in the above manner will now be described.

Figure 16:
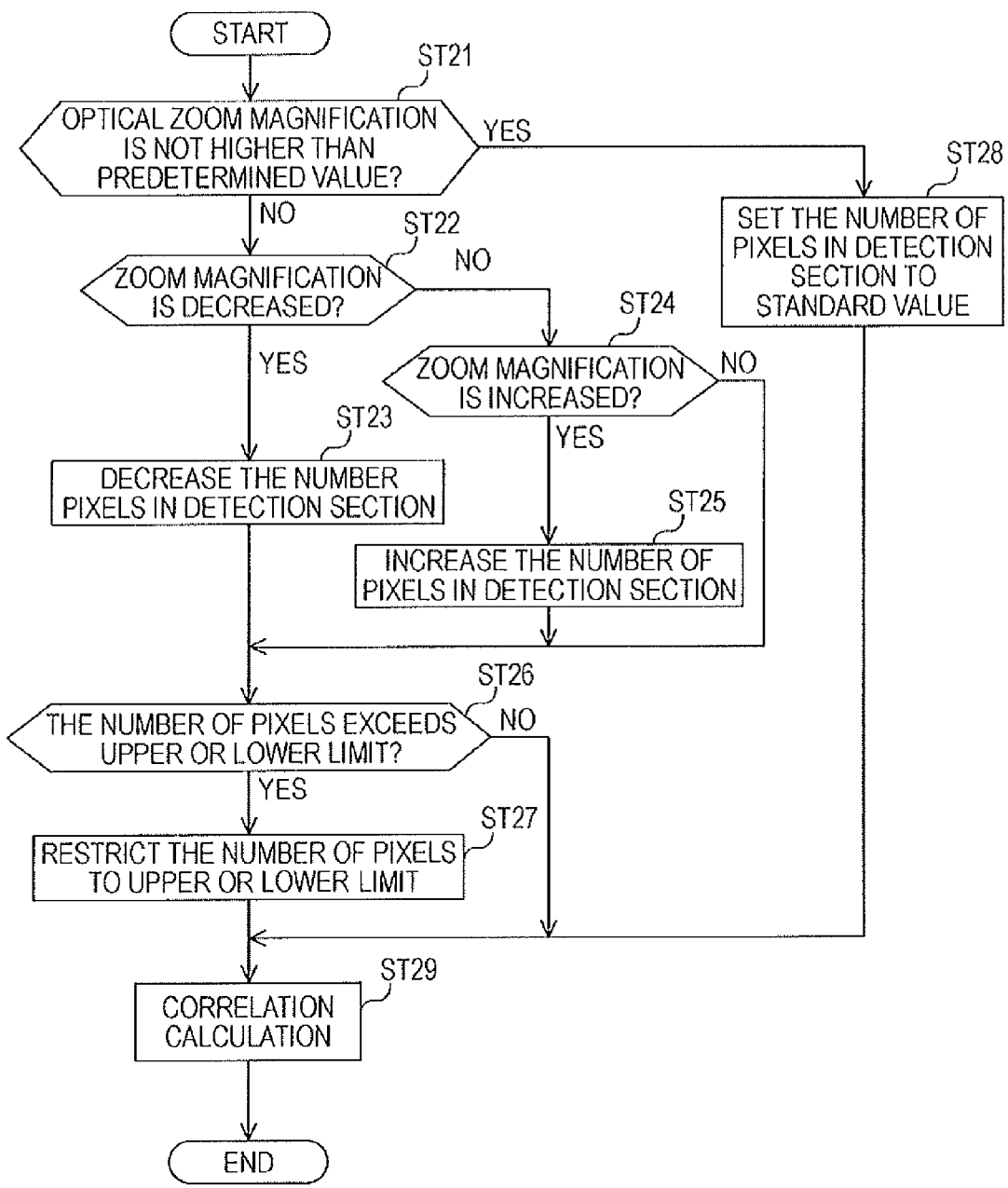
FIG. 16 is a flowchart showing an example of the basic operation of the image pickup apparatus according to the second embodiment of the present invention.

FIG. 16 is a flowchart showing an example of the basic operation of the image pickup apparatus 1B according to the second embodiment. This basic operation indicates an operation concerning the control of the phase difference AF module 20 in accordance with the optical zoom magnification in the interchangeable lens 3 and is performed by the controlling unit 101B.

Referring to FIG. 16, in Step ST21, the controlling unit 101B determines whether the zoom magnification concerning the optical zoom is not higher a predetermined value. Specifically, the controlling unit 101B calculates the optical zoom magnification on the basis of information about the lens position detected by the lens position detector 39 in the interchangeable lens 3 to determine whether the optical zoom magnification is not higher than a predetermined threshold value a. If the optical zoom magnification is not higher than the predetermined value, the operation proceeds to Step ST22. If the optical zoom magnification is higher than the predetermined value, the operation proceeds to Step ST28.

In Step ST22, the controlling unit 101B determines whether the zoom magnification concerning the optical zoom is decreased. For example, the controlling unit 101B determines whether the photographer operates the operation collar of the interchangeable lens 3 to zoom out the subject image. If the zoom magnification is decreased, the operation proceeds to Step ST23. If the zoom magnification is not decreased, the operation proceeds to Step ST24.

In Step ST23, the controlling unit 101B decreases the number of pixels in the detection sections Eh and Ei (FIG. 14) set in the criterion parts Pa and Pb, respectively, in the phase difference AF module 20, as in Step ST4 in FIG. 8. In other words, the controlling unit 101B shortens the section lengths of the detection sections Eh and Ei in accordance with the decrease in the zoom magnification concerning the optical zoom.

In addition, the controlling unit 101B increases the count of shifts in the detection sections Eh and Ei in the criterion parts Pa and Pb, respectively, in accordance with the decrease in the number of pixels in the detection sections Eh and Ei in Step ST23. In other words, the controlling unit 101B increases the count of shifts in the detection sections Eh and Ei in accordance with the zoom magnification concerning the optical zoom.

In Step ST24, the controlling unit 101B determines whether the zoom magnification concerning the optical zoom is increased. For example, the controlling unit 101B determines whether the photographer operates the operation collar of the interchangeable lens 3 to zoom in the subject image. If the zoom magnification is increased, the operation proceeds to Step ST25. If the zoom magnification is not increased, the operation proceeds to Step ST26.

In Steps ST25 to ST29, the controlling unit 101B performs steps similar to Steps ST6 to ST10 shown in FIG. 8.

The image pickup apparatus 1B decreases the number of pixels in the detection sections Eh and Ei set in the criterion parts Pa and Pb, respectively, in the phase difference AF module 20 in response to the zoom-out by the optical zoom in the above manner, so that the focus detection can be performed, for example, only for the near-side subject even if the mixture of near and far subjects can possibly occur in the focus detection area. As a result, it is possible to perform the appropriate focus detection in accordance with the zoom state by the optical zoom.

Modifications

The live view display may not necessarily be performed on the basis of image data sequentially acquired by the image pickup device 7 for the live view display arranged in the manner shown in FIG. 4 in the above embodiments of the present invention. The live view display may be performed on image data sequentially acquired by the image pickup device 5 for the actual image capturing arranged above the primary mirror 61, as in an image pickup apparatus 1C shown in FIG. 17.

Figure 18A:
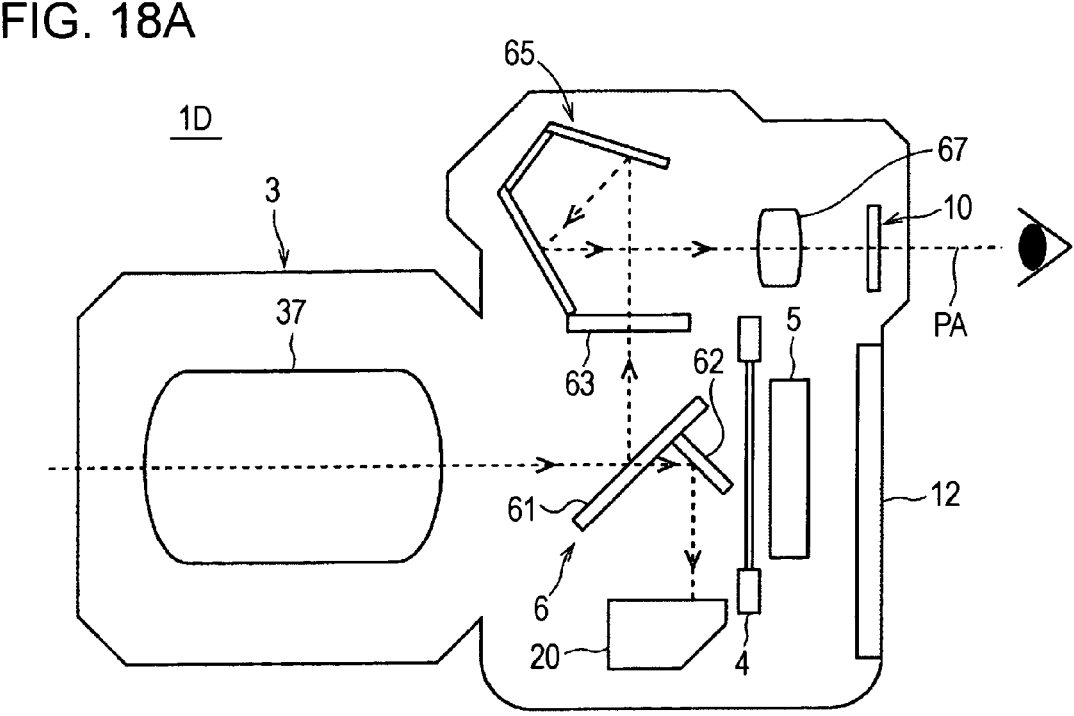
FIGS. 18A and 18B are vertical cross-sectional views of an image pickup apparatus according to another modification of the present invention.
Figure 18B:
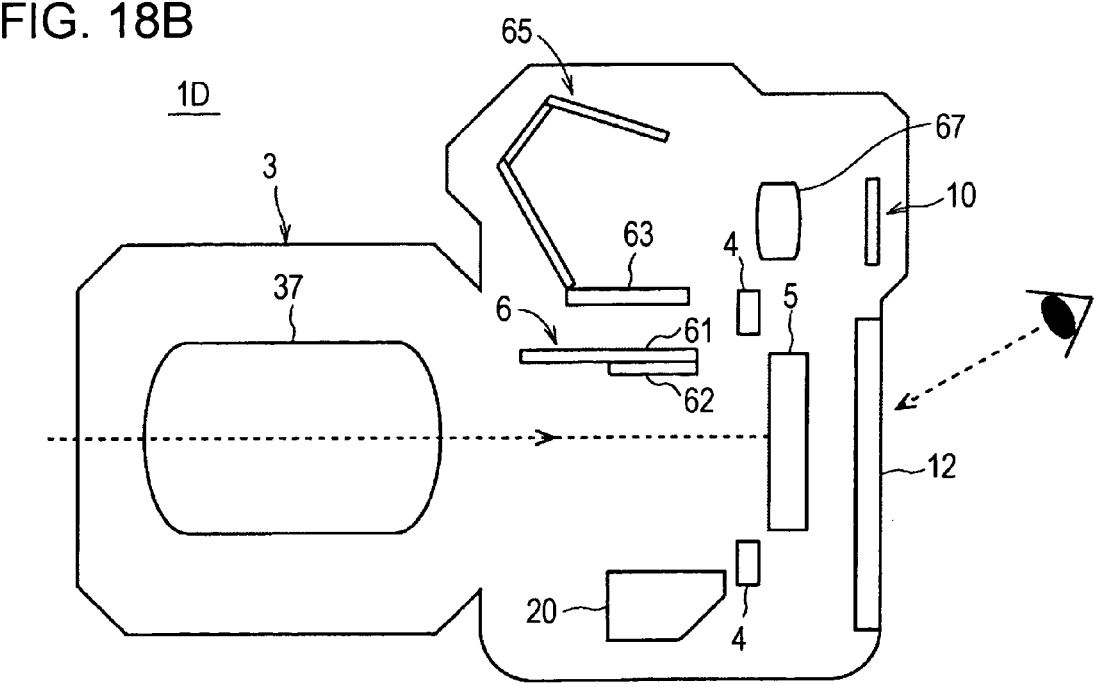

Alternatively, the primary mirror 61 and the sub-mirror 62 may be set to the down state as in an example shown in FIG. 18A when the optical finder is used, and the primary mirror 61 and the sub-mirror 62 may be set to the up state as in an image pickup apparatus 1D shown in FIG. 18B when the electronic finder is used to perform the live view display on the basis of image data sequentially acquired by the image pickup device 5 for the actual image capturing.

Figure 17:
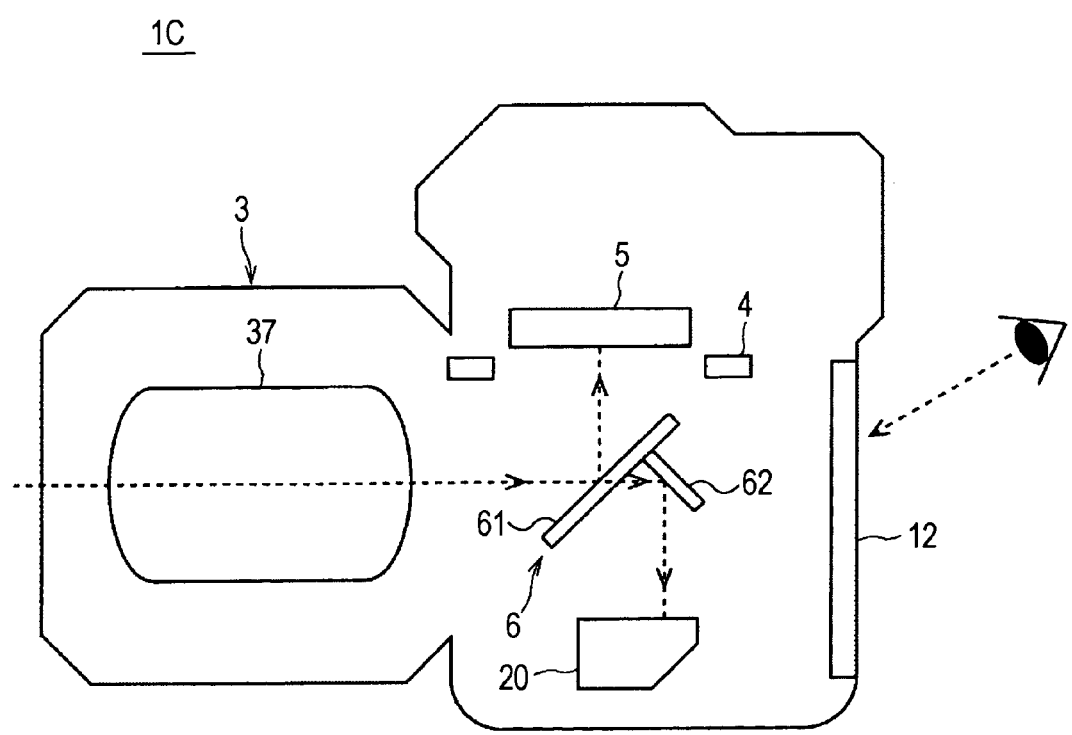
FIG. 17 is a vertical cross-sectional view of an image pickup apparatus according to a modification of the present invention.
Figure 19:
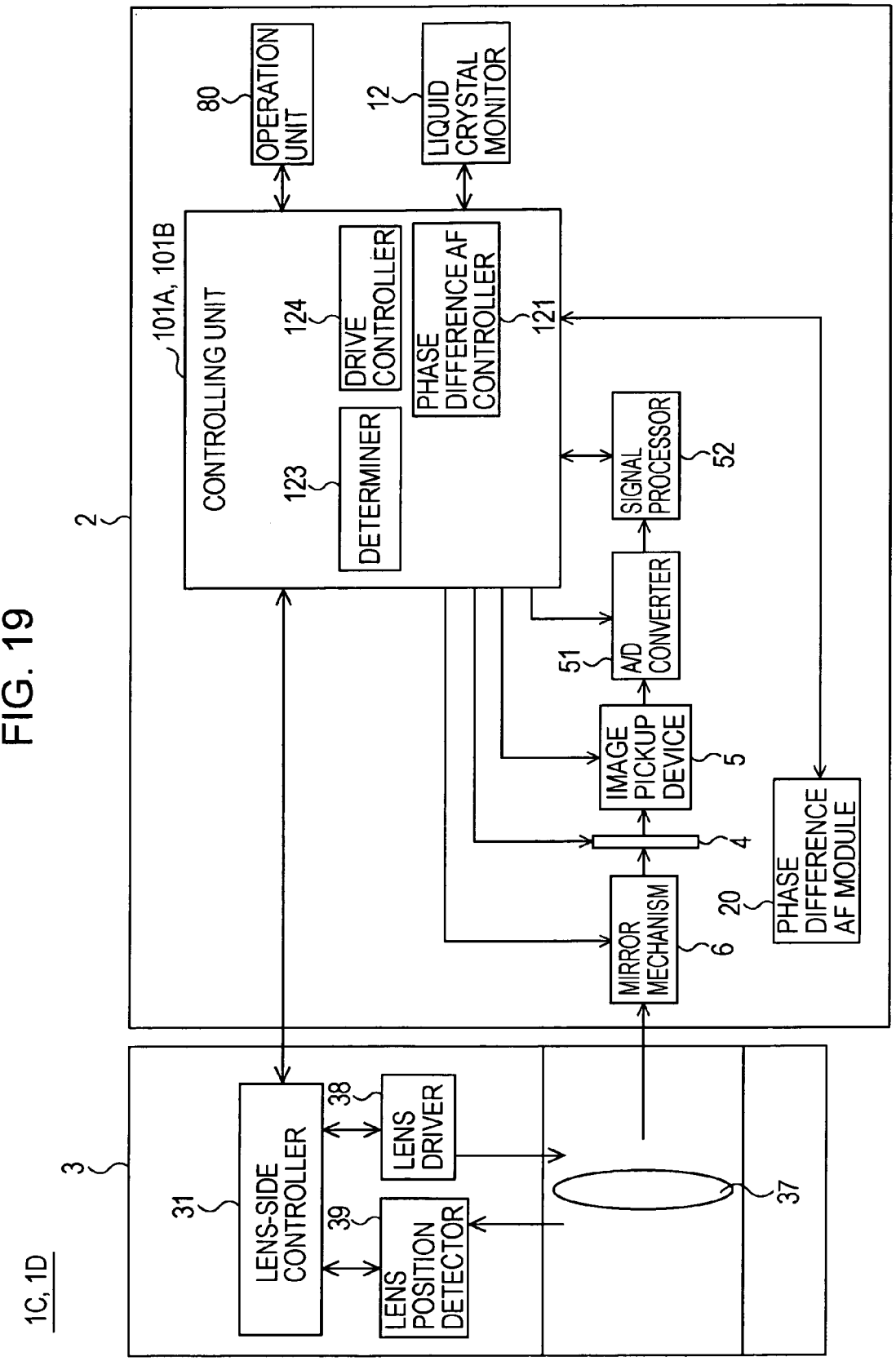
FIG. 19 is a block diagram showing an example of the functional configuration of the image pickup apparatuses according to the modifications of the present invention.

The image pickup apparatus 1C shown in FIG. 17 and the image pickup apparatus 1D shown in FIGS. 18A and 18B have a functional configuration shown in FIG. 19 in which the image pickup device 7 is removed from the configuration shown in FIG. 3.

Also in the image pickup apparatus 1C and the image pickup apparatus 1D having the configuration shown in FIG. 19, when the electronic zoom is used in the live view display or when the zoom magnification concerning the optical zoom is varied, the phase difference AF module 20 can be controlled in the same manner as in the above embodiments to perform the appropriate focus detection.

Figure 20:
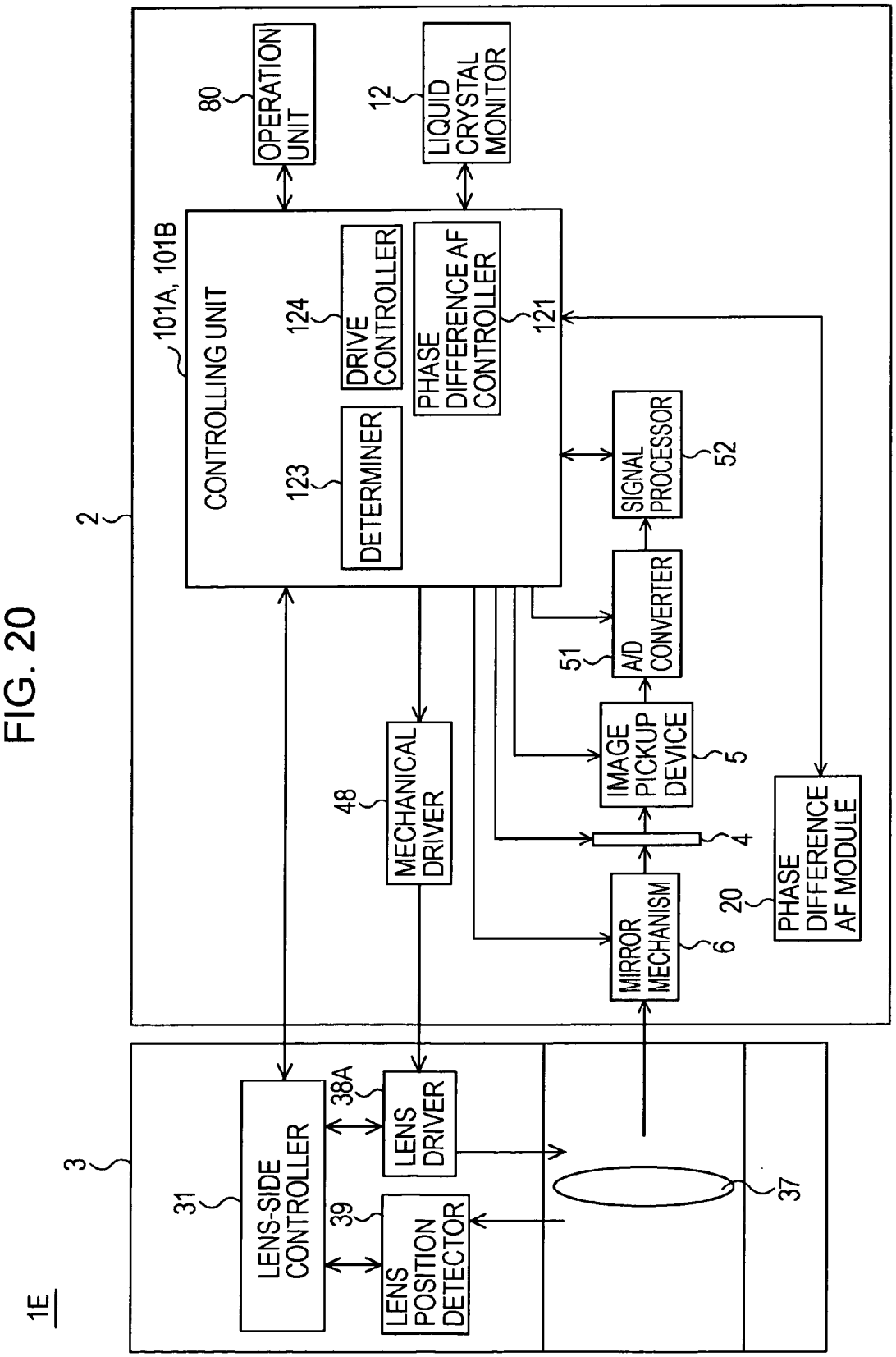
FIG. 20 is a block diagram showing an example of the functional configuration of an image pickup apparatus according to another modification of the present invention.

The lens group 37 in the interchangeable lens 3 may not necessarily be driven by the lens driver 38 (FIG. 3) including the actuator in the above embodiments. The lens group 37 may be driven by a mechanical driver 48 including an actuator in the camera body 2 via a lens driver 38A, as in an image pickup apparatus 1E shown in FIG. 20.

The luminance distribution of the optical image Da detected while shifting the detection section Ec in the criterion part Pa by one pixel may not necessarily be compared with the luminance distribution of the optical image Db detected while shifting the detection section Ed in the criterion part Pb by one pixel, as shown in FIG. 6, in the above embodiments. The luminance distribution of the optical image Da detected in the fixed detection section Ec in the criterion part Pa may be compared with the luminance distribution of the optical image Db detected while shifting the detection section Ed in the criterion part Pb by one pixel. For example, the characteristic portion Dc (FIG. 6) of the optical image Da is detected on the basis of the luminance distribution of the optical image Da of the subject detected in the relatively large detection section Ea shown in FIG. 5 before activating the electronic zoom, and only the detection section Ecm (FIG. 6) including the detected characteristic portion Dc is set in the criterion part Pa after activating the electronic zoom. Then, the luminance distribution of the optical image Da detected in the detection section Ecm is compared with the luminance distribution of the optical image Db detected while shifting the detection section Ed in the reference part Pb by one pixel. This method can increase the speed of the focus detection.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   an imaging optical system capable of varying a zoom magnification concerning optical zoom;
   detecting means for performing focus detection in phase difference detection;
   focusing means for performing focus control of a lens in the imaging optical system on the basis of the result of the focus detection by the detecting means; and
   imaging means capable of generating an image signal concerning an optical image of a subject, received through the imaging optical system in which the focus control of the lens is performed,
   wherein the detecting means includes
   a sensor unit including a first licensor and a second licensor in which pixels are arranged;

setting means for setting detection sections having the same section length in the first licensor and the second licensor;

focus detecting means for performing the focus detection in the phase difference detection on the basis of an optical image of the subject detected in each detection section set in the first licensor and the second licensor; and section length controlling means for decreasing the section length of the detection section in accordance with a decrease in the zoom magnification.

2. The image pickup apparatus according to claim 1, wherein the setting means includes shifting means for sequentially shifting the set position of the detection section in the first licensor and/or the second licensor, and wherein the detecting means includes means for increasing the count of shifts by the shifting means in accordance with a decrease in the zoom magnification.

3. An image pickup apparatus comprising:

an imaging optical system capable of varying a zoom magnification concerning optical zoom;

a detecting unit configured to perform focus detection in phase difference detection;

a focusing unit configured to perform focus control of a lens in the imaging optical system on the basis of the result of the focus detection by the detecting unit; and an imaging unit capable of generating an image signal concerning an optical image of a subject, received through the imaging optical system in which the focus control of the lens is performed, wherein the detecting unit includes a sensor unit including a first licensor and a second licensor in which pixels are arranged;

a setting unit that sets detection sections having the same section length in the first licensor and the second licensor;

a focus detecting unit that performs the focus detection in the phase difference detection on the basis of an optical image of the subject detected in each detection section set in the first licensor and the second licensor; and a section length controlling unit that decreases the section length of the detection section in accordance with a decrease in the zoom magnification.

* * * * *